July 7, 1925.
H. B. ROBINSON
1,544,777
AIR COUPLING FOR PIPE AND HOSE LINES
Filed Dec. 10, 1923
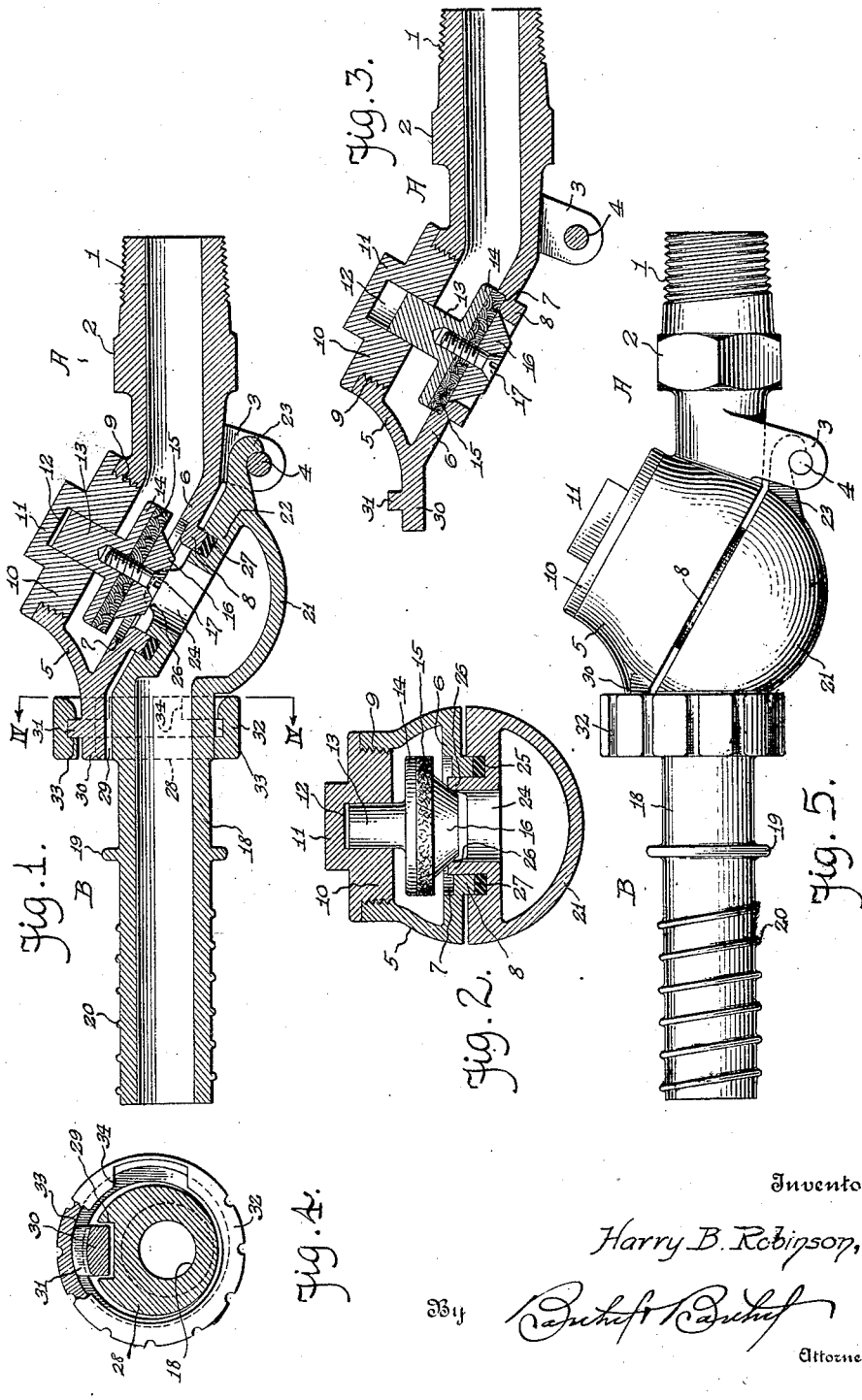
Inventor
Harry B. Robinson,
By
Attorneys Patented July 7, 1925.

1,544,777

UNITED STATES PATENT OFFICE.

HARRY B. ROBINSON, OF MUSKEGON, MICHIGAN.

AIR COUPLING FOR PIPE AND HOSE LINES.

Application filed December 10, 1923. Serial No. 679,623.

*To all whom it may concern:*

Be it known that I, HARRY B. ROBINSON, a citizen of the United States, residing at Muskegon, in the county of Muskegon and State of Michigan, have invented certain new and useful Improvements in Air Couplings for Pipe and Hose Lines, of which the following is a specification, reference being had therein to the accompanying drawings.

This invention relates to air hose and pipe line couplings, and has reference to certain improvements over those hose couplings disclosed in my Patents No. 1,236,364, dated Aug. 7, 1917, and No. 1,278,020, dated Sept. 3, 1918, said patents disclosing couplings including separable members that may be expeditiously connected together to insure a tight and non-leakable joint. One of the couplings includes a ball check valve and I have found that such a valve cannot be made absolutely air tight and requires a greater period of time to close.

My first improvement is the elimination of a ball check valve and the substitution therefor of a flat disk valve which insures an absolute air tight connection with parts that will withstand a maximum wear and not require special tools when such parts are to be renewed. In using a disk valve a quicker and more positive action is obtained with an equal pressure on all parts of the valve for maintaining the same closed when the coupling members are separated.

Another improvement is a coupling ring or a clamping member by which separable parts or members of the coupling are held together. The ring or clamping member is constructed so that it has an eccentric wedging action for drawing one part of the coupling into intimate sealing relation with the other part of the coupling, and there is no danger of the coupling parts becoming accidentally displaced.

There are other improvements in the design and general construction of the coupling and all of said improvements will be hereinafter specifically described and then claimed.

Reference will now be had to the drawing, wherein

Figure 1 is a longitudinal sectional view of the complete coupling;

Fig. 2 is a cross sectional view of the same;

Fig. 3 is a longitudinal sectional view of the valve member of the coupling showing the check valve in closed position;

Fig. 4 is a cross sectional view taken on the line IV—IV of Fig. 1, showing the improved clamping ring or member, and Fig. 5 is a side elevation of the complete coupling.

The coupling comprises members or parts generally designated A and B and part A includes a pipe or hose connection 1 having a nut portion 2 and angularly disposed lugs 3 connected by a pin 4, said lugs and pin constituting a socket member adapted to receive an element of the coupling member B. The inner end of the coupling member A terminates in a somewhat semi-spherical body 5 having a comparatively flat equatorial wall 6 provided with a central valve seat 7 and an outstanding collar 8. The body 5 opposite the wall 6 has a large opening 9 with the walls thereof screwthreaded to receive a plug 10 having a nut portion 11 and axially of the plug 10 is a guide bore 12 for the stem 13 of a check valve, which includes a disk 14, a washer or gasket 15, a cap 16 and a screw 17. The washer or gasket 15 is clamped against the disk 14 by the cap 16 and the screw 17 extends through the cap, washer or gasket is firmly clamped in position. The diameter of the washer or gasket is such that it may readily enter the valve seat 7 and close the wall 6. With pressure of fluid or liquid on the disk 14 the disk valve will be held to its seat and close the coupling member A when the coupling members are separated.

The coupling member or part B includes a hose or pipe connection 18, which for hose attachment has a peripheral abutment 19 and a spirally disposed rib 20 on which a hose or flexible member may be clamped. It is obvious that the connection of each coupling member may be of such configuration as to accommodate any hose, pipe or other conduit to be attached thereto.

The inner end of the hose connection 18 has a semi-spherical hollow body 21 provided with an angularly disposed or equatorial wall 22 and projecting laterally from said wall is a hook shaped member 23 adapted to be placed in the socket member of the coupling member A with the hook shaped member 23 in hooked engagement with the pin 4 engaging the lugs 3. The wall 22 has a central opening 24 and an annular groove 25 is circumferential of the opening 24 and separated therefrom by an annular wall provided with upstanding opposed projections 26 which are adapted to engage the cap 16 of the coupling member A and cause the disk valve to be opened when the coupling members A and B are coupled together. The wall about the opening 24 provides a sleeve which enters the collar 8 of the coupling member A and in the groove 25 is a washer or gasket 27 which is compressed by the collar 8 entering the groove 25 to insure a non-leakable connection between the coupling members A and B.

On the coupling member B, adjacent the body 21 is an eccentric enlargement 28 provided with a longitudinal groove 29 to receive a tongue 30 carried by the coupling member A, said tongue having a transversely disposed lug 31. Rotatable on the eccentric enlargement 28 is a clamping ring 32 having its inner wall provided with an eccentric or cam groove 33 to receive the lug 31 and said lug is adapted to enter the groove 33 through a notch or clearance opening 34 in the face of the clamping ring 32. With the groove 33 in eccentric relation to the periphery of the clamping ring 32, as best shown in Fig. 4, the clamping ring may be rotated to place the notch 34 opposite the groove 29 so that the clamping ring may receive the tongue 30 or be fitted over said tongue. Then by rotating the clamping ring in either direction the groove 33 receives the lug 31 and causes the tongue 30 to be pressed towards the walls of the groove 29. With the hooked shaped member 23 in the socket member of the coupling member A and pressure brought to bear on the tongue 30 the coupling member A is forcibly drawn towards the coupling member B, that is, the walls 6 and 22 are brought into proximity to each other with the collar 8 producing pressure on the washer or gland 27, consequently the connection between the coupling members is packed and made non-leakable against fluid or liquid pressure in the communicating hollow bodies 5 and 21 of the coupling.

To facilitate adjusting the clamping ring 32 the periphery thereof is castellated, serrated or otherwise roughened, as shown in Figs. 4 and 5. One end of the clamping ring 32 may have a flared opening to permit of it being easily placed over the enlargement 28 of the coupling member B.

From the foregoing it will be observed that the coupling members may be easily and quickly articulated and just as readily separated, even with fluid or liquid pressure in said coupling members. With these members devoid of springs and parts that cannot become accidentally displaced the longevity of the coupling is materially increased and a structure provided that may be used in general for coupling purposes.

One embodiment of my invention has been illustrated, but it is to be understood that the structural elements are susceptible to such changes as are permissible by the appended claims.

What I claim is:—

1. A coupling comprising separable members, a socket member carried by one of said coupling members, a hook carried by the other coupling member and adapted to engage in said socket member, a tongue on the socket carrying coupling member, an eccentric enlargement on the hook carrying coupling member adapted to receive said tongue and hold said tongue whereby said coupling members are in adjoining communicating relation, and a rotatable clamping ring on said eccentric enlargement and provided with a groove to receive a portion of said tongue, said ring being rotatable in either direction to secure said coupling members in adjoining relation.

2. Means for connecting coupling members wherein a portion of one of said coupling members overlies the other coupling member, said means comprising an eccentric enlargement on one of said coupling members, and a notched and circumferentially grooved clamping ring rotatable on said eccentric enlargement and adapted to clamp the overlying portion of the coupling member relative to the eccentric enlargement.

3. A coupling comprising separable members adapted to be placed in adjoining communicating relation, said coupling members having flat walls with one of said walls provided with an annular groove adapted to receive a collar of the adjoining wall with a gasket in the groove on which the collar may seat, a plug carried by the collar carrying coupling member, a valve stem slidable in said plug, a disk valve carried by said stem and adapted to seat in the flat wall of the collar carrying coupling member, and means carried by the adjacent flat wall of the other coupling member adapted to impinge against said disk valve and open said valve when said coupling members are placed in adjoining relation.

In testimony whereof I affix my signature in presence of two witnesses.

HARRY B. ROBINSON.

Witnesses:
MARIE E. MORTON,
MATT H. MORTON.